Nov. 3, 1936.                P. BRAACH                2,059,623
                      MEANS FOR HEATING LIQUIDS
                    Filed Sept. 25, 1935        2 Sheets-Sheet 1

Inventor:
P. Braach
by Glascock Downing & Seebold
Attys.

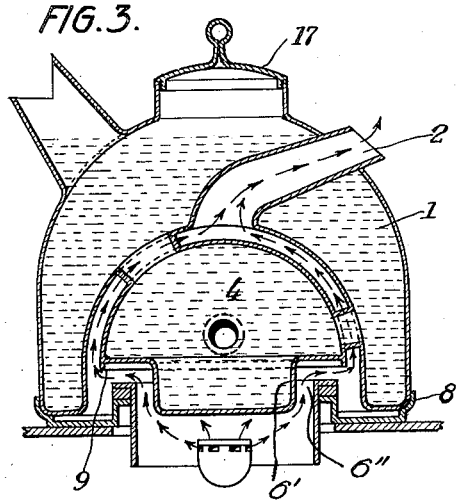
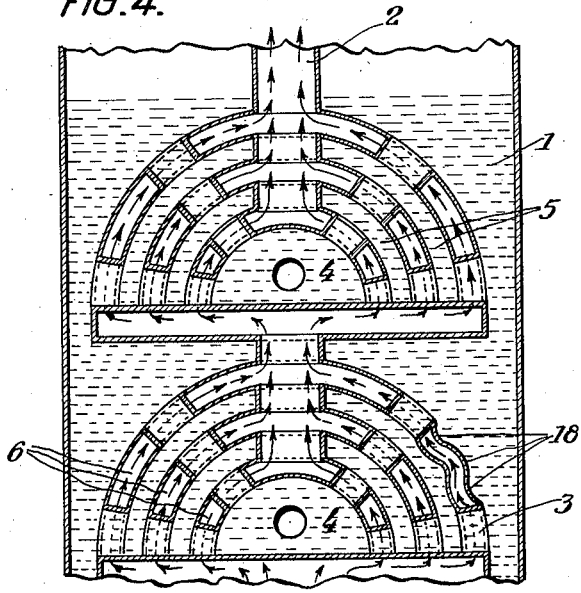

Patented Nov. 3, 1936

2,059,623

UNITED STATES PATENT OFFICE 2,059,623

MEANS FOR HEATING LIQUIDS

Paul Braach, Siegen in Westphalia, Germany

Application September 25, 1935, Serial No. 42,148
In Germany September 25, 1934

6 Claims. (Cl. 53—9)

The known containers for heating liquids intended for gas, spirit or oil stoves and the like have the disadvantage that a large part of the heating gases developed by the burner pass into the atmosphere and are lost on account of excessive mixing with cold air which increases with the distance from the burner, and on account of a too short contact with the vessel. It is the object of the present invention to avoid this drawback.

The invention is illustrated in the accompanying drawings in three constructional examples.

Fig. 3 is a vertical section of the device with the gas outlet tube curved to the side and with the bottom of the container depressed.

Fig. 4 is a vertical section broken away at the top and at the bottom through an arrangement with horizontally and vertically duplicated inner containers.

Figure 1:
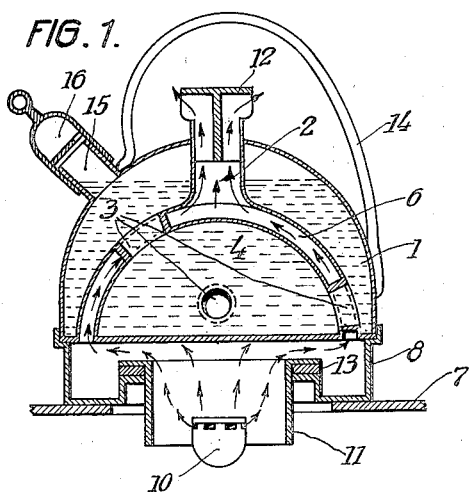
Fig. 1 is a vertical section through the device.
Figure 2:
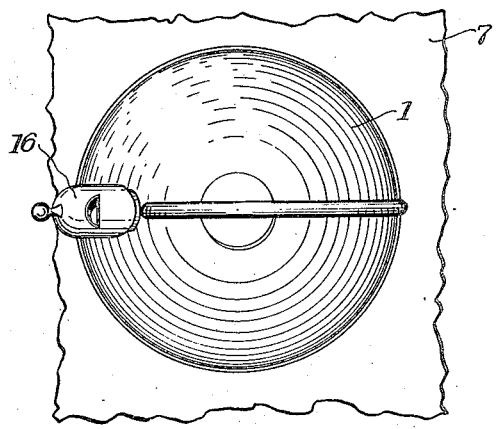
Fig. 2 is a plan corresponding to Fig. 1.

In the outer container 1 with gas outlet tube 2 the inner containers 4, 5 which are connected together and with the outer container through sleeves 3, are built in at intervals so that slots 6 for the passage of gas opening into the gas outlet tube are left between the containers, in which slots the heating gases passing through flow along two or more walls of the vessel. By the angular depression of the bottom of the inner container as at 6', there is formed below the inner container and the heating gas passages an annular chamber 6'' in which the heating gases, which tend to escape toward the outer side of the liquid containers, are compelled to enter the heating gas passages 6 and to intensively heat the two liquid containers. In order to catch the water which is deposited on the walls of the vessel during the strong cooling of the gases in the gas slots there is provided an annular shell 8 carrying the container and resting on the stove plate 7. According to Fig. 3 the dropping edge 9 prevents this deposited water from spreading under the bottom of the inner container 4. The gas guide ring 11 which surrounds the burner 10 at a suitable distance concentrates the flames under the inner container 4 and prevents excessive mixing of the heating gases with cold air from the side. Between the gas guide ring and the annular shell there is a heating insulating disc 13 through which the transmission of heat to the annular shell is made more difficult. In order with long boiling to avoid undue heating of the handle 14, according to Figs. 1 and 2 a gas distributor 12 is provided at the opening of the gas outlet tube. The handle 14 serves for lifting the container and the outlet 15 for emptying the container. The steam whistle 16 indicates the boiling temperature of the liquid. According to Fig. 3 the gas outlet tube 2 is bent over towards the side to make room for the opening closed by the cover 17. The bottoms of the containers 1 and 4 are hollow or partly depressed to bring them nearer to the flame. According to Fig. 4 the heating surface is correspondingly increased by the horizontal and vertical repetition of the inner containers 4, 5 and by corrugating the wall parts 18. The arrows indicate the path of the gases.

The corrugation of the material can also be effected in the various walls and bottoms of the containers in the manner of the wall parts 18. The containers can also be provided with outlet and inlet cocks or tubes, and if the lower annular shell is removed can be used as kettles on coal or electric hot plates. The device may be made of suitable material, as, for example, aluminium, nickel, steel or metal alloys of any kind, glass, earthenware and the like and with any suitable covering.

What I claim is:—

1. Device for heating liquid intended preferably for stoves with concentrated flames such as gas, spirit and oil stoves, comprising a liquid container with dome-shaped heating surface over a hemispherical liquid container, the former embracing with its dome-shaped heating surface the other hemispherical liquid container, hemispherical narrow heating gas passages between the liquid containers, formed by the lower dome-shaped heating surface of the upper liquid container and the upper wall of the lower hemispherical liquid container, liquid connecting tubes between the individual containers and a heating gas outlet in the uppermost liquid container.

2. Device for heating liquid intended preferably for stoves with concentrated flames such as gas, spirit and oil stoves, comprising a liquid container with dome-shaped heating surface over a hemispherical liquid container, the former embracing with its dome-shaped heating surface the other hemispherical liquid container, hemispherical narrow heating gas passages between the liquid containers, formed by the lower dome-shaped heating surface of the upper liquid container and the upper wall of the lower hemispherical liquid container, liquid connecting tubes between the individual containers, a heating gas outlet in the uppermost liquid container extending from the middle, that is to say the uppermost point of the hemispherical heating gas passages between the two liquid containers.

3. Device for heating liquid intended preferably for stoves with concentrated flames such as gas, spirit and oil stoves, comprising a liquid container with dome-shaped heating surface over a hemispherical liquid container, the former embracing with its dome-shaped heating surface the other hemispherical liquid container, hemispherical narrow heating gas passages between the liquid containers, formed by the lower dome-shaped heating surface of the upper liquid container and the upper wall of the lower hemispherical liquid container, liquid connecting tubes between the individual containers, an inclined heating gas outlet in the uppermost liquid container extending from the middle, that is to say the uppermost point of the hemispherical heating gas passages between the two liquid containers.

4. Device for heating liquid intended preferably for stoves with concentrated flames such as gas, spirit and oil stoves, comprising a liquid container with dome-shaped heating surface over a hemispherical liquid container, the former embracing with its dome-shaped heating surface the other hemispherical liquid container, hemispherical narrow heating gas passages between the liquid containers, formed by the lower dome-shaped heating surface of the upper liquid container and the upper wall of the lower hemispherical liquid container, an angularly depressed bottom on the inner hemispherical liquid container for forming an annular depression at the bottom of the device and at the beginning of the heating gas passages, liquid connecting tubes between the individual containers, a heating gas outlet in the uppermost liquid container extending from the middle, that is to say the uppermost point of the hemispherical heating gas passages between the two liquid containers.

5. Device for heating liquid intended preferably for stoves with concentrated flames such as gas, spirit and oil stoves, comprising a liquid container with dome-shaped heating surface over a hemispherical liquid container, the former embracing with its dome-shaped heating surface the other hemispherical liquid container, hemispherical narrow heating gas passages between the liquid containers, formed by the lower dome-shaped heating surface of the upper liquid container and the upper wall of the lower hemispherical liquid container, an angularly depressed bottom on the inner hemispherical liquid container for forming an annular depression at the bottom of the device and at the beginning of the heating gas passages, a dropping edge on the outer rim of the inner liquid container, liquid connecting tubes between the individual containers, a heating gas flue in the uppermost liquid container extending from the middle that is to say the uppermost point of the hemispherical heating gas passages between the two liquid containers.

6. Device for heating liquids intended preferably for stoves with concentrated flames such as gas, spirit and oil stoves, comprising a liquid container with dome-shaped heating surface over a hemispherical liquid container, the former embracing with its dome-shaped heating surface the other hemispherical liquid container, hemispherical narrow heating gas passages between the liquid containers, formed by the lower dome-shaped heating surface of the upper liquid container and the upper wall of the lower hemispherical liquid container, an angularly depressed bottom on the inner hemispherical liquid container for forming an annular depression at the bottom of the device and at the beginning of the heating gas passages, a dropping edge on the outer rim of the inner liquid container, liquid connecting tubes between the individual containers, one liquid connecting tube being arranged in the extension of an outlet tube on the outer container, a heating gas flue in the uppermost liquid container extending from the middle, that is to say the uppermost point of the hemispherical heating gas passages between the two liquid containers.

PAUL BRAACH.